Jan. 17, 1933. F. C. HUTCHINSON Re. 18,715

MACHINE FOR STRAIGHTENING AND SHEARING LONG STOCK

Original Filed Feb. 5, 1927 3 Sheets-Sheet 1

INVENTOR
FRANK COLE HUTCHINSON,
BY F.B. SHUSTER CO., DEC'D.
ASSIGNEE.
Philip Farnsworth
ATTORNEY Jan. 17, 1933. F. C. HUTCHINSON Re. 18,715

MACHINE FOR STRAIGHTENING AND SHEARING LONG STOCK

Original Filed Feb. 5, 1927 3 Sheets-Sheet 2

INVENTOR
FRANK COLE HUTCHINSON,
BY F.B. SHUSTER Co. DEC'D ASSIGNEE.
Philip Rappaport
ATTORNEY Jan. 17, 1933. F. C. HUTCHINSON Re. 18,715

MACHINE FOR STRAIGHTENING AND SHEARING LONG STOCK

Original Filed Feb. 5, 1927 3 Sheets-Sheet 3

INVENTOR
FRANK COLE HUTCHINSON,
BY F.B. SHUSTER CO., ASSIGNEE.
Philip Farnsworth
ATTORNEY Reissued Jan. 17, 1933

Re. 18,715

UNITED STATES PATENT OFFICE

FRANK COLE HUTCHINSON, DECEASED, LATE OF RUTHERFORD, NEW JERSEY, BY THE F. B. SHUSTER COMPANY, OF NEW HAVEN, CONNECTICUT, ASSIGNEE

MACHINE FOR STRAIGHTENING AND SHEARING LONG STOCK

Original No. 1,703,885, dated March 5, 1929, Serial No. 166,165, filed February 5, 1927. Application for reissue filed March 4, 1931. Serial No. 520,126.

This invention relates to means for straightening and shearing wire or other long relatively narrow metallic stock, and particularly to a machine for this purpose which is adapted to receive such stock as it is delivered to the user in large coils, feed the stock from such a coil while deforming it into a new metallic set including straightening the stock out into a straight piece and shear off portions of said stock of uniform predetermined length after the same successively have been so deformed so that each successively sheared off sub-length shall include the same length of metal without bends extending transversely of its length resulting from its curved metal set in the original coiled form. The invention also relates to improvements in the shearing mechanism employed as an element of such machine.

One of the purposes for which metal stock of the kind referred to is used is in placing wires around packing cases and the like, and portions of wire used for this purpose require not only to be cut from the coil into appropriate lengths, but also to be fully straightened out in order to obtain uniformity of cut lengths and to facilitate handling and securing around the case.

One of the principal objects of this invention is to provide a simple and economical apparatus by which the above and similar uses may be accomplished in a satisfactory and efficient manner.

The invention consists in the novel construction, arrangement and combination of various devices, elements and parts, as set forth in the claims hereof, one embodiment of the same being illustrated in the accompanying drawings and described in this specification as an example.

In the accompanying drawings

Figure 1:
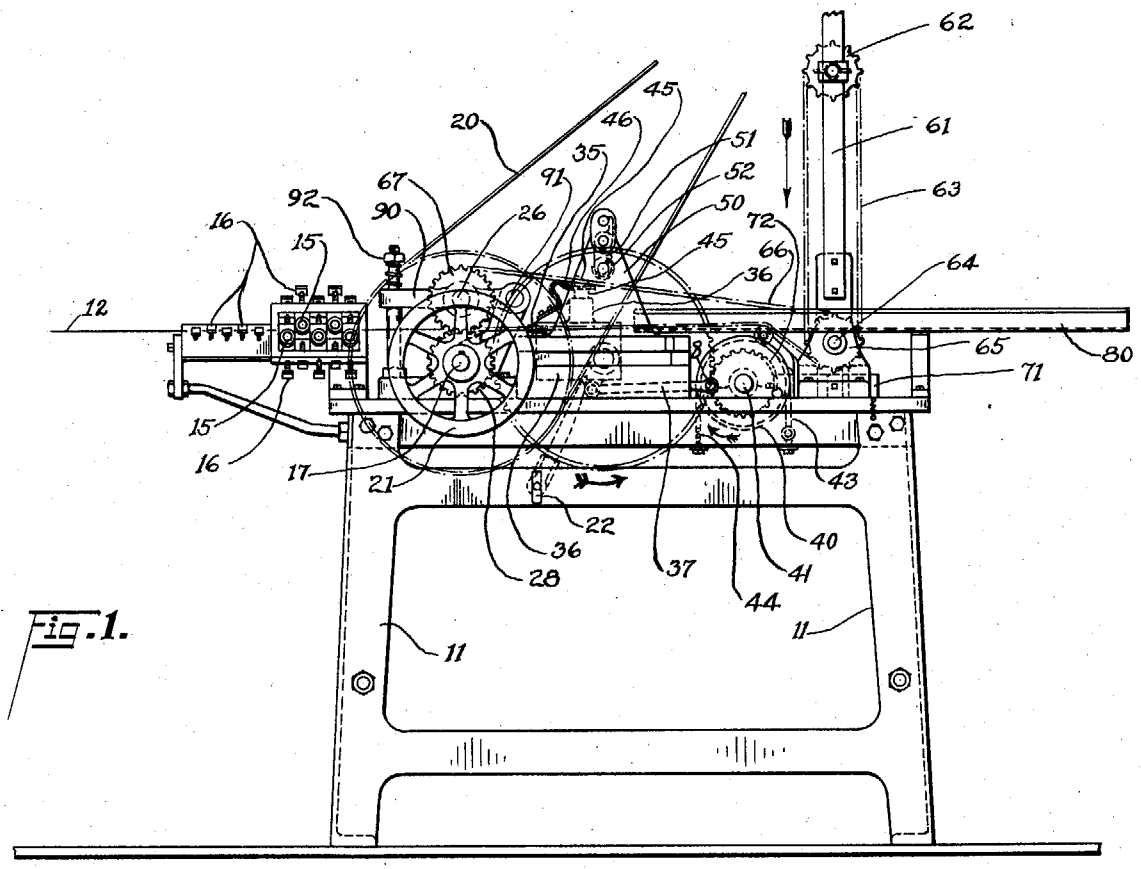
Fig. 1 is a side elevation of a machine constructed according to this invention.

In carrying this invention into effect in the embodiment thereof which is selected for illustration in the accompanying drawings and for description in this specification, there is provided a supporting frame 11 upon which are mounted the operative parts of the machine. The coil of wire or other form of long relatively narrow metal stock to be deformed and straightened and sheared into uniform sub-lengths, is fed in at the forward end of the machine shown at the left in Fig. 4. Two wires are shown, designated 12. These wires pass through perforated guides or inlet members 13 (see Fig. 4) and then pass rightward to rear successively between a series of straightening deforming devices 14 and 15, suitably mounted on the supporting frame 11 of the machine (see Figs. 1 and 4). These metal-deforming devices preferably are rollers or rotating disks, and they have peripheral grooves to receive the stock when it is not of flat cross-section. Adjusting devices 16 are shown by which the position of these rollers 14, 15 may be changed so as to accommodate any long stock of different thicknesses.

At the beginning of the operation the stock is forced through the perforated guides 13 and between the rollers 14—15, if necessary the stock-end being initially threaded through by hand, left to right, and from there the stock is led to the drawing or stock-feeding devices 30 on or operatively connected with the main driving shaft 17. It will be understood that the structure and operation of this improved apparatus may be duplex, that is to say, as shown, it is capable of taking care simultaneously of two long lengths 12 of relatively narrow stock run through the machine side by side, though at a suitable distance apart, or of operating upon stock from either one or two coils thereof as desired. In the mechanism now to be described, where the various parts are mentioned, but with no explicit reference to the doubling of operations above referred to, it must be understood that certain of these parts may be duplicated in the machine, as shown, while other parts are common to both sets of mechanism, all of which, however, will be easily understood by an inspection of the drawings in connection with the description of the exemplary machine.

The main driving shaft of the machine is designated 17. This driving shaft has at one end the usual driving pulley and idler pulley 18 and 19, over which passes a belt 20 connected with some suitable source of power, and at the other end a hand wheel 21. A belt-shifter of the usual type is shown at 22.

Figure 3:
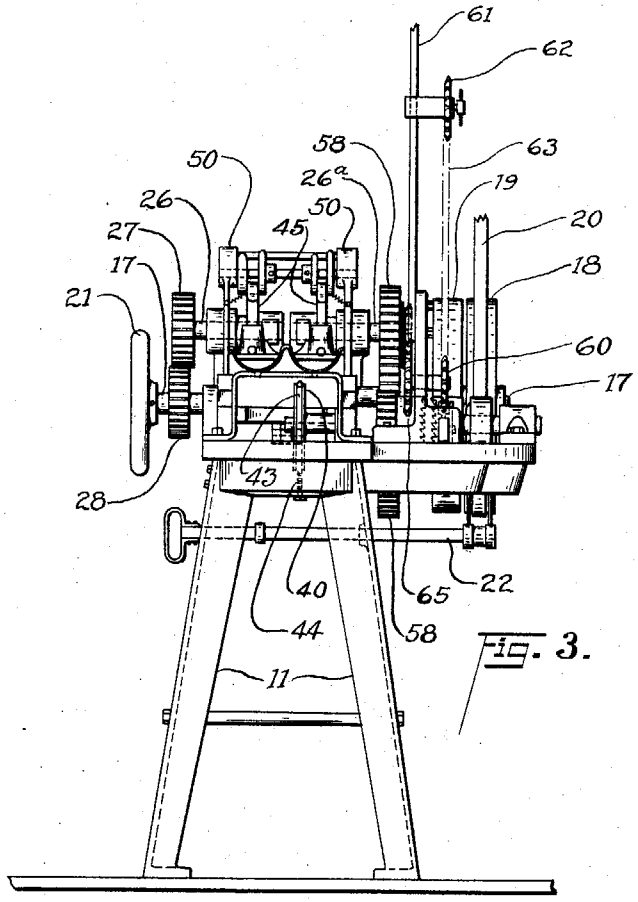
Fig. 3 is an end elevation looking in the opposite direction and showing the other end of the machine at right in Fig. 1, including the parts in rear of Fig. 1.
Figure 2:
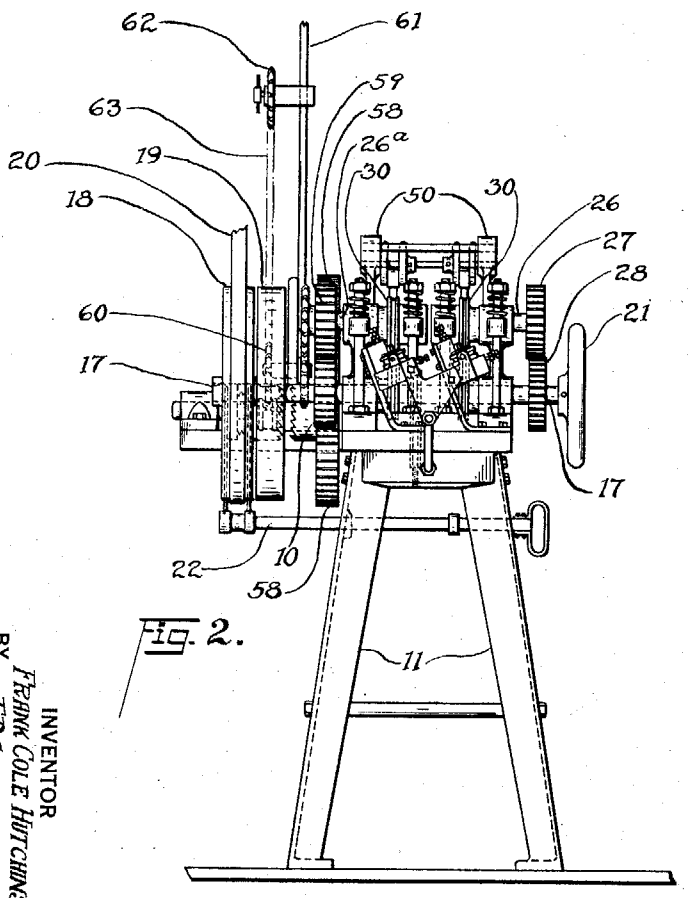
Fig. 2 is an elevation of one end of the machine, looking from the left, Fig. 1.
Figure 4:
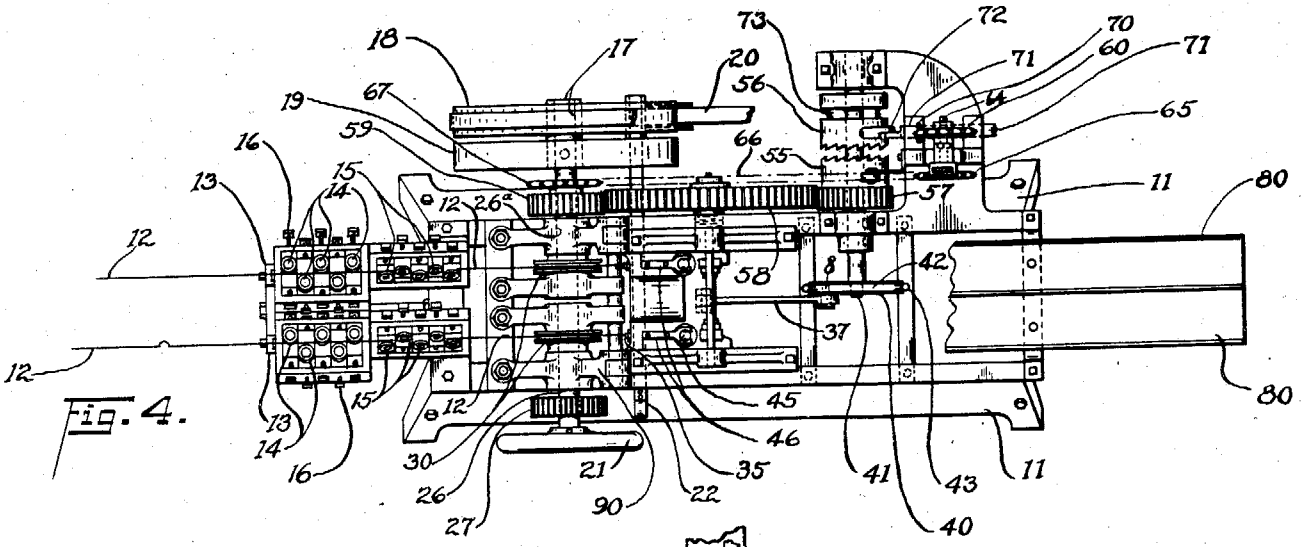
Fig. 4 is a plan view of the exemplary machine.

The main shaft 17 carries near one end and just inside of the hand wheel 21 (see Figs. 2 and 3) a gear wheel 28, and near the other end, inside of the driving and idler pulleys, shaft 17 carries a similar gear wheel, which is not easily discerned in the drawings but which may be seen by a careful inspection of Fig. 2 where the wheel mentioned is designated 10. Above the shaft 17 are adjustably journaled (as hereinafter described) a pair of shafts 26 and 26ª. The ends of these shafts carry gears 27 and 59 respectively (best shown in Fig. 4), the gear 27 meshing with the gear 28 on one end of the shaft 17, and the gear 59 meshing with a corresponding gear 10 on the other end of the shaft 17 (only seen in Fig. 2). On the shafts 17, 26 and 26ª, intermediate their ends, are said grooved drawing or feeding wheels or rolls 30 between which the stock passes and by which the same is drawn through the machine. These stock-pulling wheels are best shown in Fig. 4, where the upper pair is designated 30. The upper wheels are also shown in Fig. 2, the corresponding lower wheels appearing less clearly and partially in dotted lines.

The shafts 26 and 26ª are adjustably journaled, so as to permit the upper feeding wheels 30 thereon to be raised or lowered slightly and thereby brought nearer to or further away from the lower pair of wheels 30 on the shaft 17. This object is attained by journaling the shafts 26 and 26ª in swinging arms 90 (best shown in Fig. 1), four in all, two for the shaft 26 and two for the shaft 26ª. Arms 90 at one end are supported pivotally on the shaft 91, and at the other end are capable of vertical adjustment by means of adjusting devices 92. The object of this method of mounting is to permit wires or other long metal stock of different gauge to be operated upon at the same time in duplex in the two sides of the machine, this being rendered possible by a slight adjustment in the distance between the pair of feeding wheels 30 on one side of the machine or the other.

As the long stock is drawn into the machine by the feeding wheels 30, it passes into a tubular guide 35, which cannot be very clearly shown in the main drawings, although its position is indicated in Fig. 4. This device is, however, well shown in Fig. 5, which is a view on an enlarged scale of a modified form of the shearing mechanism of Figs. 1–4, with its appurtenant parts, altho Fig. 5 serves also to represent the parts in proximity to the shearing tools in the main form of the invention as well. The tubular guide 35 is screw-threaded so as to be movably secured into the casting or tool-carriage 36, which is slidably mounted on the frame of the machine, Fig. 1, and which is reciprocated rectilinearly along the stock by a link or pitman 37 pivotally attached thereto, and also pivoted by the pin 8 to a wheel 40 on a shaft 41, Fig. 4, pin 8 being an offset from shaft 41 which offset in the preferred form shown is of an eccentric type which acts to impart harmonic motion to the tool-carriage 36. This wheel 40 has a groove 42 in its periphery and in said groove rides a loop of wire or the like brake-band 43, which is held taut by a spring 44 (see Fig. 1) and which serves as a brake to check the rotation of the wheel 40 and its shaft 41 and to hold them still when the same is not being operated by the other mechanism hereinafter described. As shown, said braking mechanism is applied continuously, all the time; the operation of the shearing mechanism being effected by power which overcomes the effect of the brake and the latter becoming effective after the cessation of the application of power to the shearing mechanism as in a manner to be described. The offset connection 40, 8, 37 also cooperates with said braking mechanism when a clutch to be described is employed, in restricting the operation of the tool-carriage 36 to a single complete reciprocation along the length of the stock 12.

Figure 5:
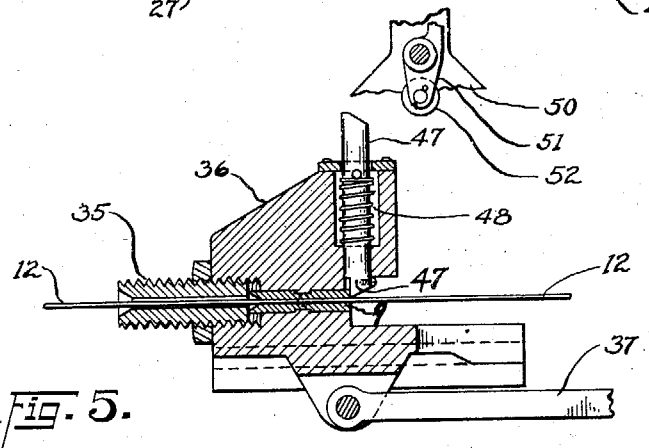
Fig. 5 is a view partly in section and on an enlarged scale, showing certain shearing features of the machine, and showing certain features thereof in a modified form.

Movable with the cross-head or tool-carrier 36 are two cooperating tools adapted to shear the long stock 12 up into portions of predetermined uniform suitable lengths as desired. In the embodiment of the invention shown in Figs. 1, 2, 3 and 4, the knife, blade or tool 45 is movable both vertically and horizontally by power from shaft 41, i. e., both along the length of and across the stock; and flat springs 46, Fig. 4, are shown tending to hold said tool 45 upward out of the path of stock 12. In the modification shown in Fig. 5, the same tool is designated 47 and is shown as pushed down rectilinearly in carrier 36 and normally held up by a helical spring 48 out of the path of stock 12 continuously advancing rightward. In practical use the modification shown in Fig. 5 is in many respects preferable, as flat springs such as 46 are more liable to break; both forms are considered, however, to be within the spirit of this invention. In Fig. 5 also, the shearing tool which cooperates with knife or blade 47 is shown as a hollow die 9 fixed in shear-head 36 and carried thereby back and forth rectilinearly along the length of the stock in alinement with guide 35, this die 9 being the first of the two tools in the rightward direction of stock-feed and being interiorly formed to fit stock 12, and tool 9 being freely reciprocable by head 36 rectilinearly back and forth along the periphery of continuously moving stock 12. Shearing is effected by the cooperative action of the right end of this tool 9 and the lower end of knife, blade or tool 45 or 47, which is held in a recess in carriage 36 in a position beyond tool 9 in the direction of the stock-feed. As shown in Fig. 5, hollow tool 9 preferably is flared at left to facilitate entrance of the end of stock 12 when the latter first passes rightward from its coil and thru shear-head or tool-carrier 36; but the remaining hollow interior of tool 9 at the right preferably is formed to fit the stock approximately so as to constitute a support holding the stock 12 rigid up against the other tool 47 as the latter moves down across the end of tool 9 and across the stock while the stock is moving rightward at the instant of shearing, at substantially the same rate as the rightward movements of the two tools 47, 9 at the instant of shearing. Thus, as the first or hollow tool 9, regularly makes a complete rectilinear reciprocation horizontally with its carrier 36, (very short relative to sheared sub-lengths) caused (in the example) by the offset mechanism such as 8, 40 and by pitman 37, said tool 9 continues to surround the stock and rides back and forth along the stock supporting the latter in all the different relations of tool 9 and stock 12 during the short rectilinear reciprocations of the tool and during the continuous movement of the stock in one direction. As shown, Fig. 5, the mounting of the other or second shearing tool 47 beyond tool 9 in the direction of stock-feed (to right, Fig. 5), prevents interference by tool 47 with the supporting of the stock by hollow tool 9 when tool 47 for shearing is forced across the stock and across the end of tool 9; but the arrangements for tool 47 are such, as shown, that it always moves with tool 9 back and forth along the stock; and second tool 47 also is so mounted just rightward of tool 9 that when it is forced across the stock it passes in contact with and alongside the right end of tool 9 for proper conduct of the operation which is a true shearing operation not necessarily involving cutting thru the steel stock by a cutting edge of tool 47. At the instant of shearing, both tools are moving at the same speed and in the same direction as the moving stock, (rightward), so that at that instant the stock is not issuing from or moving relative to the right end of hollow tool 9. At that critical instant, however, the stock not only is supported by the lower portion of tool 9, but the upper portion of the latter, closed around the top of the stock, holds rigid the portion of the stock just to the left of the cooperating ends of the two tools, so that the shearing of the continuously moving stock by the short-stroke shearing means as a whole is effected under conditions when the stresses by the tools on the metal stock cannot produce any undesirable movements, out of proper shearing position, of said portion of the stock to the left of the tools. Also, and when, after completion of shearing, the rate of movement of the shearing mechanism in the same direction as the stock begins to be reduced, (owing to the harmonic action of the preferred offset mechanism such as 40, 8, 37), then the continuation of the uniform and rightward feeding movement of the stock causes the fresh right end of the latter to emerge from the right end of hollow tool 9, even before the tools reach the end of their rightward movement; the rate of such emergence increasing comparatively gradually as the rate of the tools rightwardly decreases until they reach the end of their rightward movement along with the stock. Also, when thereafter the shearing mechanism commences its movement leftward, (the stock continuing to move rightward), the rate of emergence of the stock rightward beyond hollow tool 9 is increased abruptly and continues as the shearing mechanism is moved back leftward positively by parts 40, 8, 37. But during all the time when the shearing means may be moving leftward, the hollow tool 9 rides along stock 12 in the opposite direction from the stock movement, and at all times supports the left-hand portion of the stock of which the right-hand portion is moving to increasing distances rightward of the two tools.

The extent of the rectilinear reciprocation of the carriage 36 and the tools along the stock is extremely short as compared with the sheared sub-lengths of stock, i. e., of the order of inches as distinguished from feet of sub-lengths. Also in any case the rate of movement during the reciprocation is much slower than the rate of stock-feed save at the instant of shearing; the horizontal tool-rate being of course zero at the ends of each direction of reciprocation whether the tool-reciprocations be continuous, or intermittent as shown and preferred. In the example, wherein a clutch is employed as preferred, the reciprocations occupy only a small portion of the total time of operation of the machine as a whole, and occupy only small portions of the successive times occupied in pulling the portions of stock by the continuously power-operated feed-rolls 30. In this preferred form with clutch, most of each said stock-portion for each shearing operation is fed, in the example, while the shearing mechanism is in a normal position of rest at left at an extreme limit of its movement along the length of the stock preferably at the left as shown; and the stock-length then fed extends rightwardly beyond tool 9, Fig. 5. The successive shearing cuts by the tools 9, 47 are intermitent of course even if a clutch be not employed but carriage 36 be moved continuously back and forth.

The support 80, Fig. 4, cooperates with hollow tool 9 in supporting the stock, as will be described hereinafter, support 80 continuing thus to act during the successive shearing operations as well as when the carriage 36 may have zero rate as at left and right, so that by the joint action of supporting tool 9 at left, Fig. 5, and of support 80, at right, Fig. 4, the length of stock extending well to the right beyond the shearing mechanism, is supported, during shearing, in a position which insures proper conduct of the shearing operation. As a basis for the described shearing operation at the instant when the shearing mechanism is moving at the same speed in addition to the same direction as the stock, the mechanism which continuously operates the feed-rolls 30 and the driven clutch element 55 is such as to operate them in coordinated time relation; that is, the construction of the machine is such that feed-rolls 30 and the tool-drive clutch element 55 in the example have rates of movement which always bear a definite relation to one another, irrespective of what their absolute rate may be; said clutch element 55, as shown, for example being driven from the gears which rotate the shafts of said feed-rolls 30. On such basis, the particular mechanism disclosed is as stated in the following paragraph, by way of example, for the purpose of forcing tool 47, Fig. 5, across the end of hollow tool 9 by the power from shaft 41 and of doing so at the instant when the movement of both tools 9 and 47 rightwardly along the stock has been accelerated from their normal zero rate of movement at extreme left to the point toward the right where they are moving at the same speed as the stock.

Suitably supported in a pair of upwardly-extending arms 50 on frame 11, Fig. 1, are swinging links 51 (best shown in Fig. 5) pivotally attached to 50 so that they may swing leftward but are prevented from swinging to the right. The lower ends of these links 51 carry cam-rollers 52. The upper end of the blade 47 is beveled, to form a cam-surface, as best shown in Fig. 5, and when the sliding carriage, shear-head or tool-carrier 36 is drawn by the link 37 rightward in the direction of stock-movement toward clutch-shaft 41, Fig. 4, the beveled or cam surface of tool 47 passes under the cam-roller 52 and said tool is depressed forcibly by the power of the movement of carrier 36 forced rectilinearly by shaft 41, etc., (because links 51 cannot swing rightward), thus causing the lower end of the tool 47 acting alongside tool 9 to shear stock 12 at a predetermined point of the movement of the two tools rightward in the direction of stock movement when said movements of both stock and tools are synchronous in speed as well as identic in direction. While the two tools are being returned positively leftward by movement of link 37 toward the left during the latter half of its reciprocation, then the link 51 is free to be swung leftward out of the way of the upper end of tool 9 and is so swung by the upper left unbeveled upper end of the tool 47 moving leftward with carrier 36 and link 37, until 51 rides up over tool 9 and falls down into its normally operative position shown in Fig. 5, after the tool 47 moving leftward has passed beyond link 51.

The pitman or link 37 is operated by the wheel 40, which is fast on the shaft 41, in the following manner, wheel 40 serving as a crank-arm by virtue of the mounting of link 37 eccentrically to it by crank-pin 8, offset from shaft 41, Fig. 4. Also keyed on to said shaft 41, so that while axially slidable thereon it is not relatively rotatable, is (in the example) a normally stationary but intermittently rotated driven clutch element 56, which is adapted to engage with the continuously rotated or driving clutch element 55, which, with pinion 57 is loose on said shaft 41, these clutch-elements as shown involving positive interlocking as by their toothed periferies and exemplifying the various known types of positive locking clutches which may be employed as distinguished from ordinary friction clutches involving uncertain or variable slippages between the clutch-elements, the positive-acting type of clutch being employed in this invention to provide for the production in a manner to be described, of predetermined uniform lengths of sheared sub-lengths, in combination with the controls hereof which also are designed and arranged for production of such uniform lengths. The driving clutch element 55 is continuously rotated during the operation of the machine, as by gears 57 and 10 (see Fig. 4), and particularly by large, heavy gear 58 providing high momentum. Shaft 41 normally is stationary with driven clutch element 56. The mass of large continuously rotating gear 58 assists, as a fly-wheel, in starting shaft 41 quickly, under load of parts 40, 37, and the shearing means including carriage 36, etc.

An exemplary means for controlling the intermittent operation of positive-locking clutch 55—56, i. e., predetermining the length of sheared sub-lengths, is as follows. Toward the rear of the machine at right, Fig. 4, is a sprocket-wheel 60. A cooperating sprocket wheel 62 is slidably and adjustably supported on a long upwardly extending arm 61, Fig. 1, above the wheel 60. The vertical sprocket chain 63 engages with the fixed sprocket 60 and adjustable sprocket 62, Fig. 3, and is adapted to be adjusted readily to different lengths as the upper or adjustable sprocket 62 may be set or adjusted at a higher or lower point upon the relatively long vertical arm 61 which supports said adjustable sprocket 62. The sprocket 60 is fast on a lower shaft 64, and another sprocket 65 also is fast on this shaft (best shown in Fig. 4). Over fixed sprocket 65 a driving chain 66 runs horizontally leftward to the sprocket 67 on the shaft 26[a] (see Figs. 1 and 4). The rotation of shaft 26[a] and sprockets 67 and 65 moves the vertical sprocket chains 63, in the above system, in a manner which will be well understood, counter-clockwise, i. e., downward in the direction of the arrow in Fig. 1, and rightward in its lower path. A small pin or cross bar 70 best shown in Fig. 4 is secured to the vertical chain 63 which passes over adjustable sprocket 62, and as this pin 70 on chain 63 passes downward and then rightward it operates the sliding stop 71, Fig. 4, drawing the same rightward out of engagement with the cam 72 on the surface of driven clutch element 56 fixed on stationary shaft 41, (see Fig. 4). Upon said disengagement of said stop 71 from said cam 72 by means of pin 70, the springs 73, previously compressed, force the sliding toothed driven clutch member 56 axially along shaft 41 into positive locking engagement with the toothed driving clutch member 55, which is rotated continuously (clockwise, Fig. 1) by pinion 57 and large gear 58 (anti-clockwise), whereupon clockwise rotation is imparted to driven clutch member 56 and its normally stationary shaft 41, the teeth of member 36 having meshed with clockwise rotating driving member 55 loose on shaft 41. The speed of revolution of pin 70 around the sprocket system 60, 62 can be increased greatly by adjustment of wheel 62, Figs. 3 and 4, down closer to wheel 60, thereby causing production of shorter sheared sub-lengths of stock. But for any given adjustment of wheel 62 along its long support 61, the positively-locking clutch 55—56 acts uniformly to start movement of the shearing-means, i. e., after the same length of stock has been fed by coordinated wheels 30 to the right of tool 9. The above interlocking engagement of toothed (or otherwise positively locked) clutch-members 55—56 turns the normally stationary or driven clutch element 56 and through it the normally stationary clutch-shaft 41 and wheel 40, (both clockwise) and thereby said transmission, including the mechanism between driven clutch element 56 and the parts in Fig. 5 including link 37, translates the intermittent rotary clockwise motion of driven clutch member 56 positively into both directions of harmonic reciprocating motion of carriage 36 and of the two shearing tools 47, 9 back and forth along the line of lengthwise rightward feeding motion of the stock 12; the hollow shearing tool 9 around the stock traveling or riding back and forth along the moving stock and, as above, supporting, during the shearing operation, the left end of the van portion of the long stock while portion is about to be sheared off, and said tool 9 supporting the stock previously during its feeding movement rightwardly beyond the tools and toward its position during shearing when the right end of the stock is supported by guide 80 of Fig. 4.

The two clutch elements 55 and 56 remain in engagement for a predetermined time after the rightward initial movement of the shearing mechanism 36, etc. as a whole along the stock has been reversed, so that the power of the clutch is employed to cause the positive complete reciprocation of the tools and the carrying means such as 36 for example. The shearing mechanism including hollow tool 9 is moved by the clutch leftwardly rectilinearly toward the end of its stroke at left while stock 12 continues moving rightward. For example, as shown, the clutch 55—56 is engaged until the wheel 40 has made a complete clockwise rotation and the shearing mechanism including carrier 36 thereby returned to the end of its leftward movement, at which time the said clutch members are separated (against springs 73, compressing them) by the action of the inclined surface cam 72 on the stop 71, in a manner which will be well understood; the braking mechanism, as 43—44 above, checking the rotation of wheel 40, upon such clutch-disengagement, and holding it at rest at the end of its single rotation until the next operation of the variable speed mechanism including pin 70 by chain 63 and adjustable sprocket 62, and until the consequent next intermittent right-and-left cycle of operation of the shearing mechanism 36, etc. during the continuous rightward feed of long stock 12. As above, this braking mechanism, altho continuously applied, does not come into motion-checking effect until instant of disengagement of the clutch elements from their positively interlocking relation. The brake is most effective at that time however, in stopping the mechanism 36, etc. driven by rod 37, because of the harmonic horizontal movement of carriage 36, Fig. 5, by means of the offset mechanism 8, 40 whereby as carrier 36 approaches its normal position of rest at left, its rate is gradually reduced, notwithstanding that the rate of rotating movement of the driven clutch-member 56 always is uniform with feed-rolls 30 throughout each of its intermittent single rotations. Furthermore, the braking mechanism such as 43—44 is aided in checking the intermittent mechanism by the resilient means such as helical springs 73 which are compressed against the adjacent collar, Fig. 4, by the axial movement of normally stationary driven clutch-member 56 by means of the above action of stop 71 on the cam-surface 72 on driven clutch-member 56, said spring compression absorbing some of the energy of the intermittently moving parts. During the cycle of operations of the shearing mechanism and the single rotation of driven clutch-member 56 the latter, at its surface not formed with cam 72, moves idly against stop 71; but when clutch-member 56, meshed with driver 55, has its cam surface 72 rotated into engagement with stop 71, then the power of the continued rotation of member 56 causes its cam surface 72 to push against stop 71 and thereby push driven member 56 itself axially away from driving clutch-member 55 thereby disconnecting the shearing mechanism from the main driving shaft 17 which operates also the stock-feed rolls 30 synchronously with 40. During such axial movement of driven member 56 the springs 73 are compressed, and as soon as driven member 56 is disconnected from its driving member 55, the momentum of the intermittent mechanism including carrier 36 and member 56 is exerted in finally compressing springs 73 which thereby assist the other braking means such as 43—44 and the harmonically operating offset mechanism, in bringing the intermittent mechanism including carriage 36 to a stop at its normal position of rest at left. Thereupon stop 71, and clutch-member 56 with its cam surface 72, remain stationary until stock-length-controlling pin 70 again, after its adjusted predetermined time of revolution, draws stop 71 rightward away from its position against cam 72 holding member 56 and its shaft 41 in their normally stationary positions holding springs 73 under compression; whereupon the energy stored in the springs quickly forces clutch-member 56 axially toward and into driving engagement with continuously rotating driving clutch-member 55 (positive instantly upon engagement) to cause start of rotation of shaft 41 and the next intermittent cycle of the offset and shearing mechanism always at the same time after contact of 70 with 71. Thus, as the energy stored in springs 73 by their cooperation in braking the driven mechanism, is utilized in causing clutch-engagement, so thereupon, the momentum of the continuously operated driving mechanism including large heavy flywheel gear 58, instantly, upon positive clutch-engagement, overcomes the inertia of the normally stationary shearing mechanism and shaft 41 and moves shear-carriage 36 thru its cycle of horizontal reciprocation along the path of feed of the long metal stock; and the time intervals between successive shear-cuts, (and between successive clutch-engagements when a clutch is employed), during which intervals most of the continuous stock-feeding is effected, are so great, as compared with the shortness of the reciprocation of carriage 36, that even if the load of the shearing cut on the driving means is so great as to slow up, harmlessly, during shear-cutting, the rate of stock-feed by rolls 30 and of driving clutch-member 55 coordinated with said rolls, there is ample time for the automatic speeding up of the mechanism including main drive-shaft 17 and heavy gear 58 which continuously drives clutch-member 55, to its normal rate which is sufficient not only properly to move the shearing mechanism as a whole from left but to force tool 47 promptly down and up along tool 9 and across the stock for proper shearing and return movement of tool 47 out of the stock-path. Thus in this machine are combined the features of ample power for shearing and of timely accuracy in respect of reciprocably operated mechanism of substantial mass needed for strength to withstand abrupt applications of substantial power and reversals of direction of reciprocation.

As will be seen from Figs. 1 and 4, upper right, the variable speed mechanism including pin 70, carried by long chain 63, has a long movement up and down along each side of long arm 61, and the speed of revolution of the pin as a master control corresponds with the lengths of stock to be sheared and fed rightwardly beyond the shearing mechanism before shearing and during the time between successive actuations by pin 70 of the stop 71, i. e., between successive shearing cuts. The purpose of this construction, including adjustable member 62, is that longer or shorter lengths of stock, as may be desired, may be fed by rolls 30 beyond tool 9, between the successive shearing cuts by the tools 47, 9, thus permitting longer or shorter lengths of the continuously moving stock to be sheared off. The action is uniform in all successive operations, including the slight but uniform lags in connecting and disconnecting clutch elements 55, 56 or their positive-locking equivalents, so that for a given adjustment for length of sheared sub-lengths, the tool 47 always passes alongside tool 9 down and up, at the same instant relative to the movement of both tools along the stock, and tool 47 is moved by the power of pitmen 37, Fig. 5, at the same speed as the stock at the instant of shearing, that is, when the speed of carriage 36 has been accelerated rightward to the speed of the stock but before it has been decelerated below the speed of the stock. The adjustability of slidable controlling member 62 to different definite positions relative to its relatively long path of adjustability along the length of its supporting member 61, (causing the longer or shorter times of revolution of pin 70, corresponding times of operation of clutch-stop 71, and corresponding durations of stock-feeding, as desired, between successive shearing operations), constitutes a means enabling the user of the machine to employ it on different occasions for producing different desired uniform sheared stock-lengths while continuing to employ the same unaltered time-coordinated transmissions to the stock-feeding rolls 30 and to the continuously rotating means which operates the shearing tools, as well as the same unaltered transmission between the driven clutch element 56 and the offset and shearing mechanism, such convenient adjustment of stock-lengths being distinguished from constructions necessitating the removal of one set of gearing elements ("change gears") imparting a given frequency of shearing operations desired on one occasion, and replacement of such set with a different set of gears imparting a different frequency desired on a different occasion. This result is due to the fact that the slidable or adjustable member such as 62 along a long supporting member such as 61 is included as an element of a clutch-starting mechanism which for the function thereof is substantially independent of, i. e., outside of the lines of the time-coordinated power transmissions to the feeding and shearing mechanism, altho as shown, this adjustable frequency-controlling mechanism is operated continuously, by power from the continuously operating mechanism of the machine, (i. e., in the example shown, by the mechanism also operating the feed-rolls 30), so that different uniform sheared lengths can be cut at various times according to adjustment by the user without altering the manufacturer's permanent construction of any of the gearing or other parts of the mechanisms for either feeding the stock or operating the shearing mechanism. Furthermore, the adjusted positions of control member 62 at different portions of its relatively long adjustment path along its support 61 necessarily afford indication of the length of stock-portions sheared off while a given adjustment of adjustable element 62, Fig. 1, is effective, owing to the fact that such different adjusted positions along the long supporting member 61 correspond to and predetermine different uniform stock-lengths actually sheared in accordance with any given adjustment adjustable element 62, Fig. 1. The preferred provision of the positive-locking clutch members 55—56 and the above positively operated means respectively effecting engagement and disengagement of the clutch-members, provides for uniform operations of the clutch for each successive intermittent shearing operation, at any desired adjustment of the mechanism as by member 62 for causing the positive clutch-engagements at the critically proper times necessary to produce uniformity of lengths of sheared sub-lengths. And the lack of gears and sprockets between carrier 36 and the driven member of the clutch also contributes to the desired uniformity of sheared-off sub-lengths of stock.

The most important thing is that always there is the same time-interval between the contact of 70 with 71, and the initiation of driving of clutch-member 56 by clutch-member 55.

As the end of the stock 12 is fed rightwardly beyond the tool-carrier 36 and through hollow tool 9 fixed thereon, the right end of the stock then extending more or less beyond tool 9 is supported by a suitable trough or other support 80, Fig. 4, carried by main frame 11. This supporting means 80 extends a substantial distance rightwardly beyond the shearing mechanism in the rightward direction of stock-feed, as shown, thereby accommodating the longer as well as the shorter lengths of stock to be sheared off at the various points predetermined by the relatively adjustable members 61, 62. Also stock-support 80 extends to the left, Fig. 1, to a position below but close to the line of stock-feed so that a right end of the stock emerging from hollow tool 9 fixed in carriage 36, Fig. 5, is supported by the left end of trough 80, Fig. 4; said right stock-end before shearing moving rightward along the upper surface of the bottom portion of its support 80; and the left end of trough 80 extending as close as practicable leftward to the right end of rightward movement of the reciprocable carrier 36, Fig. 5, so that when carrier 36 starts to move leftward, and when therefore the continuously fed stock 12 is moving rightward in the opposite direction very rapidly away from 16, then the left end of support 80 will receive on its top the rightward end of the rapidly increasing length of stock extending rightward of the shearing mechanism, Fig. 5. Altho the long metal stock is fairly rigid yet its substantial length of a number of feet to be sheared off could sag substantially rightward of tool 9, and the illustrated leftward extension of support 80 toward the shearing mechanism and close thereto and at about the level of the bottom of the passage thru tool 9, insures against passage of such van end of stock without sagging below the level of the passage in supporting tool 9, so that as the stock-end travels rightward of the shearing mechanism along support 80, while the left end of the stock-portion to be sheared is being moved from left toward the shearing tools, said support 80 acts to support the right end of the stock extending rightward from tool 9, Fig. 5, and support 80 continues to hold the van of the stock in proper position for shearing by 9 and 47 while the left end of the stock-portion to be sheared off is supported, until completion of shearing off of its van end, by hollow tool 9. Thus the long stock in process is supported during shearing by tool 9 and member 80 at two portions of its length respectively fore and aft of the locus of shearing, both of which portions are as close as practicable to the shearing point, i. e., the long stock is supported by hollow tool 9 itself, at the right end of which is the shearing locus, against all but longitudinal stock-feeding movement and the long stock is supported by the left end of support or guide 80 which preferably as shown is as close to the shearing locus as is practicable in view of the reciprocation of the shearing mechanism along the line of the stock and to and from the left end of guide 80. Also, as shown, the rightward extension of support 80 acts to support the advancing stock length at all its rightward portions before, during and after shearing. Also, as shown, support 80 is adapted as a guide for the stock along the line of stock-feed, against lateral movements out of the proper longitudinal stock-path, by the provision of the vertical sides of the trough-shaped support 80 specifically illustrated, so that the stock is held laterally as well as horizontally, at the right of the shearing mechanism, in the same line of lengthwise feed as at the left of the shearing mechanism and between the latter and the stock-supporting feed-rolls 30 and deforming rolls 14, 15. Upon completion of shearing of sub-lengths, relatively short but yet of substantial length, they are held by support 80 until removed therefrom by hand or by any suitable delivery mechanism. In Fig. 4 duplicate supporting guides 80 are shown side by side, this being one of several but not all the elements of the machine which are duplicated in order to provide for simultaneous operations on two independent lengths of stock 12, 12.

Several important elements of the duplex machine shown are common to the sets of mechanism which operate on the two independent lengths of stock 12, 12, the shearing operations being conducted simultaneously on the two separate stock lengths fed from two independent stock-coils to straightening rolls 14, 15. Thus, in a duplex machine embodying the invention, altho there is necessary duplication of the power-operated stock-feed rolls 30, independently adjustable feed-shafts 26, 26[a], and the shearing tools 45, 9, guide 35, and the stock-support 80, etc., yet the combination is such for economy of cost of construction that the same driving and transmitting mechanism operating said feeding mechanism and operating and controlling the shearing mechanism, operates with respect to both said duplicated mechanisms for the two separate stock-lengths 12, 12, i. e., Figs. 1 and 4, such apparatus common to the duplex operations include main power shaft 17, the head 36 and link 37 centrally thereof, Fig. 4, and all the rest of the mechanism for reciprocating 37—36 including positive-locking clutch 55—56 and the adjustable speed mechanism 62, etc., for controlling the clutch, all these in fact constituting, with frame 11, the principal portion of the machine so that they as common principal parts can be made to operate on two long stock lengths simultaneously by the arrangement of said principal parts as shown which provides for the combination therein of the above parts which are duplicated; the simultaneous shearing action by the above duplicated parts, to produce the same lengths of cut stock from both long stock-lengths, being obtained by way of the adjustability of the control member 62 for control of the simultaneous operations of both of the two pairs of shearing tools.

The operation of the above machine and the further advantages of the invention are as follows. As indicated in Fig. 5, the power of the rightward movement of shear-head 36 causes downward movement of upper shearing-tool 47 by way of roller 52. Long stock 12 has been moving rightwardly all the time, (1) while 36 has been at rest, (2) while moving rightward toward 52 which is the point at which tool 47 is forced down across the end of die 9 for shearing, and (3) while tool 47 is moving down to the stock. Thus the stock has moved rightward substantially after commencement of the rightward movement of 36, and at a higher rate up to the time of depression of upper tool 47. Adjustable sprocket 62 is set so that the total length of stock fed during (1), (2) and (3) above shall be of the desired sheared-off length. It is not practicable to effect shearing by tools 47 and 9 simultaneously with the engagement of master control 70 with sliding stop 71 which results in permitting springs 73 to slide driven clutch-element 56 into locking engagement with driving clutch-element 55. It has been found to be sufficient that the elapsed time between the engagement of 70—71 and the downward movement of upper tool 47, shall be uniform at all successive shearings after the feed thru die 9 of the stock for a sub-length to be sheared.

That elapsed time is made uniform here by cooperative construction of the shearing mechanism and the clutch 55—56. The shearing mechanism and the operating mechanism between it and the clutch must be heavy enough to withstand the high stresses involved in the metal shearing. As such necessarily heavy, and normally stationary mechanism, it abruptly puts on the clutch a heavy load the instant the clutch members are engaged to start moving the shearing mechanism from its normal position of rest. In order to avoid excessive stresses on the clutch, the mass of the shearing mechanism here is reduced to the lowest limits consistent with strength as by way of the illustrated structure of parts 36, 47 and 9, i. e., the "slave" parts which are reciprocated intermittently by the clutch. And the intermittently-moved parts connecting the reciprocating-head 36 to driving clutch-member 55 also are made light as shown, consisting only of said clutch-member, its shaft 41 and mechanism 40, 8 and 37 connected to head 36. The mounting on the machine-frame, instead of on head 36, of parts 50—52 which cause reciprocation of the upper tool 47 by the power from pitman 37, usefully reduces the mass of the intermittently moving parts by dispensing with a power connection for tool 47 from driven clutch-member 56, in addition to the connection 37 from that clutch-member to head 36. The illustrated simple arrangement involving the elimination of shafts, etc., between clutch-shaft 41 and head 36 also is useful in avoiding excessive abrupt, intermittent stresses on the clutch-teeth. Thus the necessarily fairly heavy construction of the intermittently moving metal-shearing mechanism is kept down within bounds so that it is made practicable to apply power intermittently to the shearing mechanism to start it abruptly from its normal position of rest without causing breaking stresses on the clutch-teeth. Thus, after master 70 has freed driven clutch member 56 for sliding by springs 73 so as to intermesh positively with driving clutch-member 56, the interlocking clutch parts will not be broken by the stress abruptly applied to them by the instantaneous connection of continuously rotating fly-wheel gear 58 with the normally stationary parts 56, 41, 40, 8, 37 and shear-head 37. Gear 58 is useful in over-coming the resistance of the shearing mechanism to starting, and in providing sufficient momentum to overcome the subsequent shearing load without slowing up the entire machine; but it is inevitable that such starting stresses will be applied by said gear abruptly to the clutch and normally stationary shearing mechanism; but practical use of the invention has proved that the above order of effective reduction of the masses of the intermittently moving parts will permit the inclusion of a positive-locking clutch in the combination, and also the heavy momentum gear 58, altho of course the clutch is subjected to severe treatment by the power from the gear, every few seconds when the clutch is caused by master 70 to become operative, so that it is necessary for the clutch to be constructed so as to withstand such rough treatment; and the faster the stock is fed, as is desirable, the more frequent will be the stresses on the clutch. The above provisions as to the lightness of the normally stationary intermittently movable parts permits the illustrated positive-locking character of the clutch, and the practical use of the invention has demonstrated that such positive-locking construction of the clutch is essential to the production of uniform sub-lengths. Since the stock is fed continuously, including the time between the release of clutch-member 56 by master 70 and the instant when upper tool 47 is moved across the stock-path by way of roller 52, any variation of that time will cause variation of the length of stock fed between successive shearings, and of course non-uniformity of sub-lengths. Experience has shown that very substantial variations of sub-lengths result from the slightest variation of time in successive clutch-engagements, and that such time-variations inevitably result if there is any possibility of slippage between the clutch-elements as in the case of ordinary friction clutches. In the illustrated combination of strong but light metal-shearing mechanism and positive-locking clutch, there is provided a practical means for obtaining substantial and satisfactory identity of successively sheared sub-lengths, without excessive starting stresses on the clutch, because the same time always elapses between the operation of master 70 and the depression of upper tool 47, owing to the positive locking of the clutch which insures against variable slippage upon the application of the load of starting the normally stationary shearing mechanism. For shearing the stock into uniform sub-lengths during its feeding movement, the machine is constructed as above so that at the instant of shearing, (1) the stock and both tools move in the same direction and at the same rate, and (2) at the time of depression of upper tool 47 alongside tool 9 and across the stock, the uniform stock-length has been fed to right of tool 9 along supporting guide 80. The first condition is provided for by the above described power drives of feeding-wheels 30 and of the clutch, and the second condition by the combination including the shearing mechanism and the positive-locking clutch. As shown, wheel 40 is rotated clockwise, and tool 9 is arranged to be forced across the stock-path by rolls 52 at the instant when offset 8, moving left to right, from nine to three o'clock of the revolution of wheel 40, is moving at the same rate as the stock, because in the example shown the pitman 37 is connected directly between offset 8 and shear-head 36 so that the movement of the former directly causes movement of the latter. The location of parts 50—52 on the machine frame is such as to force upper tool 47 across the stock-path at that instant of the movement of offset 8; and owing to the positive-locking action of the clutch which insures uniformity of successive time intervals between contact of 70 with 71 and the start of rotation of 56 by 55, the same length of stock 12 is fed between each two successive engagements of tool 47 with the stock; because the exclusion of time variations between clutch-engagement and commencement of rotation of 56, causes uniformity of time intervals between such tool and stock engagements. The important thing effected by this positive, uniform clutch action is the initiation of rotation of driven clutch-member 56 always after the same time interval after the contact of master 70 with stop 71, with the result of maintaining coordination between the shear-cycles and the feed-rolls 30, without variation by aberrations of clutch-slipping action. The positive-locking clutch provides for timing of the shear-cycles to the stock feed, in addition to the timing by the other mechanism, of the rate of the tools to the stock-rate at the insant of the shear-cut. There is no difficulty about adjusting the master to operate always upon the elapse of the same time interval after a previous shear-cut; and there is no difficulty about stopping the shearing mechanism instantly upon its completion of a single complete revolution, as by the braking means shown, for the brake can be made to act on the light-as-possible shearing mechanism, instantly upon disengagement of the clutch-members by operation of clutch-disengaging cam 72, as soon as the clutch has completed sufficient movement (as one rotation shown) dependent on the ratio between shaft 41 and pitman 37, to cause one complete reciprocation of the shearing mechanism. That is, there is no difficulty about obtaining exactly one complete reciprocation for each shearing operation, by means of the brake, and by the construction of cam 72 and stop 71 so as to cause clutch-disengagement at the end of the desired range of movement of driven clutch-member 56. And there is no difficulty about the ready adjustment of sprocket 62 so that master 70 will act at a time when, all other conditions being right, the desired sub-length of stock will be sheared off at the instant when upper tool 47 is depressed past die 9. But master 70 is powerless to insure uniformity of successive sub-lengths of sheared stock if after its successive operations to permit movement of driven clutch-member 56 into engagement with clutch-member 56, there are variable time intervals, no matter how short, during which an amount of stock will be fed causing substantial non-uniformity of sub-lengths, as when the driven clutch-member 56 is not started immediately in rotation as soon as it engages driving element 55. All that master 70 can do is to trip the clutch; it cannot insure that the clutch always will start the movement of the shearing mechanism at the same time after clutch-tripping. Regardless of the length of stock which may be fed between each two successive shearing operations of the two tools, and therefore regardless of clutch-slippages, the above construction of the machine is such that the tools will act properly to shear the stock because by the time upper tool 47 is depressed for shearing, both tools will be moving along the stock at the same rate as the stock. But it is the positive locking and uniform action of the type of clutch shown which insures, in addition to proper action of the shearing mechanism itself, that such action shall be at the instant intended by the adjustment of sprocket 62, (to provide for the desired times of operation of master 70), and not at some more or less later instant. The advantages of the combination in this machine of a positive-locking type of uniformly-acting clutch with the low mass of the shearing mechanism, can be appreciated by consideration of the fact that it is extremely important that the successively sheared-off sub-lengths shall be uniform within a small fraction of an inch, and a consideration of the further fact that if the stock be fed continuously at the not very rapid rate of 150 feet per minute, (two and one half feet per second), a variation in time of clutch action, after clutch-engagement, of only half a second, will cause a variation of stock-movement by rolls 30 of fifteen inches instead of the permissive variation of only a small fraction of an inch. It is plain that with the inclusion of the positive-locking type of clutch in the combination of the machine hereof, the degree of accuracy of uniformity can be made as great as may be desired, so that not only may the clutch be made effective in starting the shearing mechanism substantially instantaneously upon clutch engagement, but what is of greater importance, there will be substantially no variation, in successive clutch-operations, in the lapse of time between operation of master 70 and the starting of the shearing mechanism. However, notwithstanding the controlling importance of the uniformity of clutch operation in abruptly initiating the overcoming of the inertia of the normally stationary shearing mechanism, the timely action of the clutch-disengaging cam 72 and the effective timely action of the braking means 43 and 73 on the shearing mechanism, is also of great advantage in insuring the stoppage of the shearing mechanism promptly upon the completion of its single reciprocation along the length of the stock, for it is this which insures that the initiation of movement of the shearing mechanism always shall be from the same normal position of rest and that in turn assures proper timely action of the shearing tools regardless of the uniformity of clutch operation; that is, it insures for example, among other essential things, that upper tool 47 shall be depressed at the instant when the two tools have been moved along the stock for a sufficient distance to enable them to be moving at the same rate as the stock. Said timely stoppage of the shearing mechanism upon the completion of one complete reciprocation along the length of the feeding stock also is of importance in preventing the stock emerging from die 9, from sagging and passing below support 80.

This support 80 preferably extends as far leftward as permitted by the rightward reciprocation of head 36, but under some conditions that is not a sufficient extent to prevent the stock from passing below 80. Control element 72 and the braking means, by limiting the shearing mechanism to a single complete reciprocation, prevent head 36, after returning leftward after shearing, from again immediately moving rightward to some degree in excess of a complete reciprocation. If once head 36 did that, and then thereafter its next reciprocation were no more or less than complete, its leftward movement might occur before sufficient stock had been fed for its van to pass above support 80, and such leftward movement of 36 then would leave exposed to right of stock-supporting die 9, a length of stock sufficient to sag down below the level of 80 before reaching it so that the continued further feeding of the stock would result in the stock passing below 80. Control element 72 and the braking means thus cause the stock to pass above support 80 so that the latter can cooperate with stock-supporting die 9 in holding the steel stock in proper position for feeding and preventing it from passing below support 80 and being jammed by the continuous stock-feeding causing or requiring stoppage of the machine.

By the above combination, accurately timed metal treatment is provided for, notwithstanding that the instant when shearing can be effected is extremely short and critical. Not only is the length of stroke of reciprocation of the shearing tools along the length of the stock very short (a matter of a few inches) as compared with the length of several feet of the sheared-off sub-lengths, but the portion of that stroke at which shearing of the stock in motion is practicable (when tools and stock are moving at the same rate) is very short owing to the fact that the tools are started from rest and are brought up to speed progressively. Altho upper tool 47 reciprocates at right angles to and thru head 36, yet at the time it is depressed by roller 52, it is being moved rightward by head 36. In fact it is the power of the rightward movement of the head which causes forcible shearing depression of 47. Since tool 47 therefore moves simultaneously in two directions, its shearing movement is along a curved line, for as it passes across the stock-path it is moving also with the stock. Just as adjustable master-sprocket 62 has no power to determine any time interval between clutch-tripping and starting of the shearing mechanisms by the clutch, so the positive-locking clutch has no power to determine the movements of the two tools relative to one another and to the stock-path, the thing which determines that being the structural relation of the two tools to one another and the nature of their actuating means back to the clutch-shaft 41. The function of the adjustable master control 62, 70 is to predetermine the general dimensions of the sheared-off sub-lengths for any given adjustment of the master. The function of the positive-locking clutch in the combination is to predetermine the exact dimensions of the sub-lengths pursuant to the general control of the master. The arrangement of Fig. 5 as to the relation of the shearing tools provides for the prompt downward shearing movement of upper tool 47 immediately after the commencement of the rightward movement of both tools along the length of the stock, while yet the shearing load is not applied until after the starting load has been terminated by such rightward movement. The momentum of the continuously rotated heavy fly-wheel gear 58 is useful in handling both said loads successively.

While it is not necessary in accordance with the invention that the offset shear-operating mechanism shall be limited to connection to drive directly only one of the two shearing tools, and drive the other indirectly by way of the carrier for the first tool, as shown and preferred, yet an arrangement substantially like that described wherein that is the fact is advantageous because it simplifies the construction and operation of a machine which at simplest is not very simple. Thus, in the example disclosed, the carrier 36 of tool 9 is the one here selected for operation by the offset mechanism wherein the single connection 37 between the offset mechanism and the shearing means provides the power for moving the tool 47 not only along the stock but also at right angles thereto, i. e., alongside and across tool 9 and across the stock-path, in addition to effecting the harmonic motion in progressively beginning and ending the rectilinear movements of carrier 36 and tools 9 and 47 in opposite directions exclusively along the stock. This drive of the second tool 47 by means of its power connection to carrier 36 for the first tool 9 has the advantage in any case of limiting the masses and the complication of parts desirable to be reduced in the operation of imparting, rectilinear reciprocations to shearing means which must be sufficiently strong and massive to shear metal stock.

While it is primarily the shearing mechanism itself which is reciprocally operated by the desired form of offset mechanism, yet in the example, wherein a clutch is employed for effecting intermittently the operation of the shearing mechanism, the driven member of the clutch is connected in such way to the shearing mechanism that the power applied by way of the clutch positively operates the shearing mechanism and all the shearing parts in all directions of their movements and without dependence on the use of any springs between the clutch and the shearing tools. Furthermore here, specifically and preferably, the transmitting mechanism between the driven element of the clutch and the shearing means, is exclusively continuous, Figs. 4—5, i. e., the connections 41, 40, 8, and 37 for example, exclude all devices such as gears, chain-sprockets, etc., which might involve more or less lost motion. This latter is important for various reasons including the provision for needed accuracy if the shearing operations are to be so accurately timed as to insure absolute uniformity of successively sheared sub-lengths of stock.

On account of the continuous stock-feed, an important advantage of the disclosed practical form of a shearing machine of the short-stroke and offset type is its higher production rate than in the type employing stationary shearing means and interrupted stock-feeding heretofore employed.

Having thus described the invention, what is claimed as new and desired to secure by Letters Patent is as follows:

1. In a long stock fabricating machine, the combination with stock-feeding mechanism, of fabricating mechanism reciprocable in line with the direction of long-stock feed and including a fabricating tool simultaneously additionally reciprocable to and from the moving stock; a continuously rotating heavy fly-wheel having a rate coordinated with the rate of the stock-feeding mechanism; a uniformly-acting, positive-locking clutch operated by said fly-wheel and intermittently connectible to said fabricating mechanism; and a master-control causing said intermittent connection of the fly-wheel-driven clutch and fabricating mechanism and adjustable in desired coordination with the stock-feed.

2. In a long stock fabricating machine, the combination with stock-feeding mechanism, of a fabricating tool reciprocable both in line with the direction of stock-feed and simultaneously to and from the moving stock; revolvable eccentric mechanism intermittently effecting said tool-reciprocations; a uniformly-acting positive-locking clutch having an element normally disconnected from said eccentric mechanism; a constantly-rotating fly-wheel continuously driving said clutch element at a rate coordinated with the rate of the stock-feeding mechanism; and mechanism intermittently tripping the positive-locking clutch at desired times causing revolution of said eccentric mechanism by the moment of inertia of the fly-wheel.

3. An apparatus of the kind described and converting long relatively narrow metal stock successively and accurately into a plurality of relatively short, straight sub-lengths of uniform predetermined lengths, said apparatus including in combination the following elements and parts among the others: a frame; an inlet for the long stock; straightening means near said inlet; a cross-head slidably mounted in said frame for reciprocation along the length of the long stock over a distance short relative to the sub-lengths; a shearing tool mounted in said cross-head for shearing movement across the stock-path; continuously operating means drawing the long stock thru said inlet and feeding the same in said path of shearing movement of said tool; an operating power connection to said cross-head and moving the latter along the length of the stock; and mechanism mounted on said frame and cooperating with said cross-head in the positive movement thereof by said power connection, and positively translating the power of said movement of the cross-head into positive shearing movement of said tool in its direction across the stock-path for shearing.

4. An apparatus of the kind described and converting long relatively narrow metal stock successively and accurately into a plurality of relatively short, straight sub-lengths of uniform predetermined lengths, said apparatus including in combination the following elements and parts among the others: a frame, an inlet for the long stock, straightening means near said inlet; a cross-head slidably mounted in said frame for reciprocation along the length of the long stock over a distance short relative to the predetermined sub-lengths of stock; a shearing-tool mounted in said cross-head for shearing movement across the stock-path; continuously operating means drawing the long stock thru said inlet and feeding the same in said path of shearing movement of said tool; and an operating power connection to said cross-head which provides power for both the reciprocation of the cross-head and tool positively in both directions along the length of the stock and for the positive operation of said tool for shearing across the path of the stock.

5. An apparatus of the kind described and converting long relatively narrow metal stock successively and accurately into a plurality of relatively short, straight sub-lengths of uniform predetermined lengths, said apparatus including in combination the following elements and parts among the others: a frame, an inlet for the long stock, straightening means near said inlet; shearing mechanism including a tool and a support therefor, said tool being movable across the stock-path for shearing, and both the tool and the support being movable along the length of the stock over a distance short relative to the sub-lengths; continuously operating means drawing the long stock thru said inlet and feeding the same in the path of said tool; and an operating power connection to said tool-support which provides power both for the movement of the support and tool in a direction along the length of the long stock and for the positive operation of the tool for shearing, across the path of the stock.

6. An apparatus of the kind described and converting long relatively narrow metal stock successively and accurately into a plurality of relatively short, straight sub-lengths of uniform predetermined lengths, said apparatus including in combination the following elements and parts among the others: a frame, mechanism mounted on said frame and continuously feeding the stock longitudinally; shearing mechanism including two tools and means supporting them in shearing relation to one another, said shearing mechanism being reciprocable along the length of the stock over a distance short relative to the sheared-off sub-lengths of stock, and one of said tools being movable also to and from across the stock-path and alongside the other tool for shearing; and shear-operating mechanism positively moving said shearing mechanism in both directions of its reciprocation along the stock and once in each such reciprocation positively forcing said cross-tool across the stock-path not only at an instant when said cross-tool is moving in the same direction and at the same rate as the stock but at the instant when the same length of stock extends beyond the tools as at the shearing cut of the next preceding shear-reciprocation.

7. An apparatus of the kind described, and as defined in claim 6, and wherein the shear-operating mechanism includes means fixed in the machine frame in a location and arrangement causing the movement of the cross-tool across the stock-path by the power of the reciprocation of the shearing mechanism as a whole along the length of the stock.

8. An apparatus of the kind described, and as defined in claim 6, and wherein the means causing the movement of the cross tool in a direction to and fro across the stock-path includes a device mounted independently of the movable shearing mechanism and its operating mechanism and disconnected from both said mechanisms, said device positively forcing the cross-tool across the stock-path for shearing.

9. An apparatus of the kind described, and as defined in claim 6, and wherein the means for causing the movement of the cross-tool across the stock-path includes a device mounted independently of the movable shearing mechanism and its operating mechanism, and disconnected from them both, said device positively forcing the cross-tool across the stock-path for shearing; and said cross-tool means including also a spring arranged to be put under stress by said positive shearing movement of the tool and thereafter moving the tool back out of the stock-path.

10. An apparatus of the kind described and converting long relatively narrow metal stock successively and accurately into a plurality of relatively short, straight sub-lengths of uniform predetermined lengths, said apparatus including in combination the following elements and parts among the others: a frame, mechanism mounted on said frame and continuously feeding the stock longitudinally; shearing mechanism of small mass and including two tools and reciprocable along the length of the long stock over a distance short relative to the sheared-off sub-lengths, one of said shearing tools being movable also to and fro across the path of continuous stock-feed for shearing during feeding movement of the stock; and power operating mechanism positively moving said shearing mechanism in both directions of its reciprocation along the length of the moving stock; said operating mechanism being connected primarily to effect complete operation of only one of said tools; and said tools being combined in said shearing mechanism in an arrangement whereby said connection of the operating mechanism for said complete operation of said first tool also transmits power to the other tool for the complete operation of the latter.

11. An apparatus of the kind described and converting long relatively narrow metal stock successively and accurately into a plurality of relatively short, straight sub-lengths of uniform predetermined lengths, said apparatus including in combination the following elements and parts among the others; a frame; shearing mechanism including two tools and reciprocable along the length of the long stock over a distance small relative to the sheared-off sub-lengths, one of said shearing tools being movable also to and fro across the path of the continuously moving stock for shearing; power operating mechanism including a clutch and positively moving said shearing mechanism in both directions of its reciprocation along the length of the moving stock; said shearing mechanism and the operating mechanism between the clutch and the shearing mechanism having small mass, owing first, to the connection of the operating mechanism primarily for complete operation of only one of said tools, and owing, second, to the combination of the two tools in the shearing mechanism in an arrangement wherein said connection of the operating mechanism for said complete operation of the first tool transmits power to the other tool for complete operation of the latter; and mechanism predetermining the length of sheared-off sub-lengths of stock, said mechanism including master-controlling means recurrently tripping said clutch at times generally predetermining the times of successive startings of movement of said shearing mechanism relative to the stock-feed, said predetermining mechanism including also the provision of a positive-locking construction of said clutch causing uniform time intervals between tripping of the clutch and the startings of said shearing mechanism by the clutch thereby more accurately determining the times of successive startings of said shearing mechanism relative to the stock-feed; said small mass of the shearing mechanism and its power operating mechanism preventing breaking stress on the said positive-locking construction of the clutch by the abrupt application of the load of starting said shearing mechanism.

12. An apparatus of the kind described and converting long relatively narrow metal stock successively and accurately into a plurality of relatively short, straight sub-lengths of uniform predetermined lengths, said apparatus including the following elements and parts among the others: a machine frame; shearing mechanism including a normally stationary head mounted on said frame and reciprocable with the shearing tools along the length of the long stock over a distance short relative to the sheared-off sub-lengths, one of said shearing tools being movable also across the stock-path for shearing during stock-feeding movement; mechanism for operating said shearing mechanism including a clutch and positively reciprocating said head in both directions of its reciprocation along the length of the stock; and mechanism predetermining the length of sheared-off sub-lengths of stock, said mechanism including master-controlling means recurrently tripping said clutch at times generally predetermining the times of successive startings of movement of said shearing mechanism relative to the stock-feed, said predetermining mechanism including also the provision of a positive-locking construction of said clutch causing uniform time intervals between tripping of the clutch and the startings of said shearing mechanism by the clutch thereby more accurately determining the times of successive startings of said shearing mechanism relative to the stock-feed; said shearing mechanism having small mass preventing breaking stresses on said positive-locking construction of the clutch by the abrupt application of the load of starting said shearing mechanism.

13. An apparatus of the kind described, and as defined in claim 6, and wherein the first of the tools in the direction of stock-movement is formed with a stock-supporting passage, and wherein a second stock-support is arranged beneath the stock-path but close to the end of the stock emerging from said tool-passage and close to the limit of reciprocation of the tools in the direction of stock-movement; and wherein the stock-feeding means on the other side of the shearing tools constitutes a third means supporting the stock during shearing.

14. An apparatus of the kind described, and as defined in claim 6, and wherein the shear-operating mechanism includes an offset means between the clutch and the shearing mechanism and is constructed for movement of said tools at a rate varying in harmonic motion, and wherein the elements are arranged in a combination whereby both tools are operated by the power of the same said offset means.

15. An apparatus of the kind described, and as defined in claim 12, and wherein braking means are provided for stopping the shearing mechanism instantly upon disengagement of the clutch-interlocking, said braking means including a spring arranged for normal tendency to move the clutch-members into interlocking engagement, and including a brake-band arranged for application to the mechanism intermittently driven by the driving member of the clutch.

16. An apparatus of the kind described, and as defined in claim 12, and wherein the operating connection between said clutch and the shearing mechanism includes an offset mechanism, and the two tools are combined in cooperative shearing relation with one another and with a connection from said offset to one of them in an arrangement wherein both tools are operated by said connection.

17. An apparatus of the kind described, and as defined in claim 12, and wherein an offset device is included between said clutch and the shearing mechanism, a single shaft supports both the clutch and said offset device, and the two tools are combined in an arrangement wherein both are operated by a connection from the offset primarily to only one of them.

18. An apparatus of the kind described, and as defined in claim 6, and wherein one of the tools is formed with a stock-passage enclosing and substantially fitting the contour of the long stock, and a guiding stock-support is provided for supporting the stock fed beyond the tools, and as the hollow tool rides back and forth along the moving stock, said support being formed with a lower portion sustaining the advanced portion of the stock from downward sagging, and with lateral portions guiding the stock along its path of feed and cooperating with the hollow tool in supporting the moving stock in shearing relation with the two tools.

19. An apparatus of the kind described, and as defined in claim 12, and wherein said shear-operating mechanism includes a revolvable offset device constructed to lie normally in general parallelism with the moving stock, and wherein said cross-tool is moved by means of the offset across the stock-path for shearing at the first instant, after the start of the offset from said parallel position, when said tool is being moved by the offset also in the same direction and at the same rate as the moving stock.

20. An apparatus of the kind described, and as defined in claim 6, and wherein the uniformity of sub-lengths is further effectuated and the stock fed for cooperation with said positive-locking clutch, by the provision of oppositely-disposed pinch-rolls and staggered rolls engaging opposite faces of the stock, said oppositely disposed rolls having substantially larger diameters than those of the staggered rolls.

21. An apparatus of the kind described, and as defined in claim 12, and wherein, in said frame, a plurality of shearing-heads are mounted for simultaneous reciprocation along the length of the stock, each being of the character specified in said claim and carrying a pair of cooperating shearing tools, all said heads and tools being both operated and controlled by the rest of the mechanism common to them and including said operating mechanism and predetermining mechanism.

22. An apparatus of the kind described, and as defined in claim 12, and wherein power-operated, oppositely-disposed rolls tightly engaging opposite faces of the stock are provided to feed it positively to the shearing mechanism operated by the positive-locking clutch, and the operating transmission includes two inter-connected and exactly time-coordinated lines, one connected to the feed rolls and the other to the driving member of the positive-locking clutch.

23. An apparatus of the kind described, and as defined in claim 6, and wherein are provided two inter-connected exactly time-coordinated power transmission lines respectively connected to the stock-feeding means and to the shearing mechanism, the line connected to the feeding means providing for a rate of the stock adapted to the straightening means, and the line connected to the shearing mechanism and the shearing mechanism itself being constructed for movement of the latter in the direction and at such rate of stock-movement.

24. An apparatus of the kind described, and as defined in claim 12, and wherein a shaft is arranged transversely of the machine and supports both said positive-locking clutch and an offset device operating the shearing mechanism.

25. In a machine of the kind described, the combination with a frame, of means continuously feeding the long metal stock lengthwise, of two shearing tools; means carrying said tools and intermittently movable lengthwise of the moving stock in both directions; revolvable offset mechanism causing said movement of said tool-carrying means and tools; resilient means normally holding at least one of the tools out of the path of stock-feed, said tool being combined with an operating portion; and an abutment mounted on the frame in the path of movement of said operating portion along the stock and causing the power of said offset mechanism by way of the movement of said tool-carrying means and tool-operating portion in one direction along the stock, to force said tool positively across the stock-path for cooperative shearing action with the other tool; said abutment on the frame being freely movable by said operating portion out of the path of movement of said tool-operating portion itself in the opposite direction along the stock.

26. The invention substantially as specified in claim 25, and wherein said abutment and operating portion are provided with co-operating means including a cam surface on one and a roller on the other.

27. In a machine of the kind described, the combination with means continuously feeding the long metal stock lengthwise, of two shearing tools; and mechanism intermittently moving said tools simultaneously in directions both along the line of stock-feed and relatively toward one another across the moving stock for shearing, and back to normal positions of rest, said mechanism including resilient means normally holding at least one of the tools out of the path of stock-feed and means positively forcing said tool to the stock for shearing, temporarily overcoming the power of said resilient means, said last-named means including co-operating elements including a cam surface and a roller engaging therewith.

28. In a machine of the kind described, the combination with continuously operated means feeding the long metal stock lengthwise, of shearing means; an offset device; a positive-locking clutch intermittently operated and driving the shearing means by way of said offset device at a rate coordinated with the feed of the stock; said shearing means including two tools movable simultaneously both along the length of the stock and relatively toward one another for shearing while moving in the direction of stock-feed; means supporting the tools and formed with a stock-passage guiding the stock between the tools in their normal positions; an operating shaft extending transversely of the machine; mechanism continuously operating the driving member of said clutch and including a heavy continuously rotated element overcoming the inertia of the mechanism intermittently operated by the clutch; mechanism braking the movements of the intermittently operating elements restricting their operation to a single shear-operating cycle; said stock-feeding means including relatively adjustable pinch-rolls engaging opposite surfaces of the stock; a stock-guiding support extending beyond the shearing means in the direction of stock-movement from a point close to the reciprocating shearing means; the stock being supported during shearing at at least three portions of its length, i. e., at said feed-rolls, in the passage thru said tool-supporting means, and by said stock-guiding-support; and mechanism causing engagement of the clutch-elements, operated by power from the feed-rolls, and including an element adjustable by the user for predetermination of sheared sub-lengths.

29. In a machine of the kind described, the combination with continuously operated means feeding the long metal stock lengthwise, of normally stationary shearing means; a clutch intermittently operated and driving the shearing means at a rate coordinated with the feed of the stock; said shearing means including two tools movable relatively toward one another and the stock for shearing, and means located between the clutch and said tools and moving them simultaneously into cooperative relations for shearing; means supporting the tools and formed with a stock-passage guiding the stock between the tools in their normal positions; mechanism continuously operating the driving member of the clutch and including a heavy continuously rotated element overcoming the inertia of the mechanism intermittently operated by the clutch; mechanism braking the movements of the intermittently operating elements restricting their operation to a single shear-operating cycle; said stock-feeding means including relatively adjustable pinch-rolls engaging opposite surfaces of the stock; a stock-guiding support extending beyond the shearing means in the direction of stock-movement from a point close to the shearing means; the stock being supported during shearing at at least three portions of its length, i. e., at the feed-rolls, in the passage thru said tool-supporting means, and by said stock-guiding-support; mechanism causing engagement of the clutch-elements, operated by power from the feed-rolls, and including an element adjustable by the user for predetermination of sheared sub-lengths.

30. An apparatus of the kind described and as defined in claim 12 wherein the clutch is constructed for a plurality of positive-locking positions and the master-controlling means likewise is constructed for a plurality of positions of adjustment, for production of sheared sub-lengths of different lengths for different operating conditions of master-control and clutch; and wherein contribution to uniformity of sheared sub-lengths for the same operating conditions of master-control and positive-locking clutch is made by the provision of mechanism continuously feeding the stock and operating the driving element of the clutch at coordinated rates; all whereby the sub-lengths are all the same for given operating conditions of master-control and positive-locking clutch, but as many different sub-lengths under different conditions can be produced as there are positive-locking positions of the clutch.

31. An apparatus of the kind described and as defined in claim 12 wherein the clutch is constructed for a plurality of positive-locking positions and the master-controlling means likewise is constructed for a plurality of positions of adjustment, for production of sheared sub-lengths of different lengths for different operating conditions of clutch and master-control; the sheared sub-lengths being of uniform length under the same operating conditions of positive-locking clutch and master-control.

32. An apparatus of the kind described and as defined in claim 12 wherein contribution to uniformity of sheared sub-lengths also is made by the provision of mechanism continuously feeding the stock and operating the driving element of the clutch at coordinated rates, the clutch-operating mechanism being of high inertia relative to said small mass of the shearing mechanism thereby causing effective shearing action on metal stock notwithstanding said small mass.

33. An apparatus of the kind described and as defined in claim 12 and wherein contribution to uniformity of sheared sub-lengths also is made by the provision of mechanism continuously feeding the stock and operating the driving element of the clutch at coordinated rates.

FRANK COLE HUTCHINSON,
*Deceased,*
By THE F. B. SHUSTER CO.,
*Assignee,*
By ELMER F. SHUSTER,
*President.*